United States Patent [19]

Chundrlik et al.

[11] Patent Number: 5,014,200
[45] Date of Patent: May 7, 1991

[54] ADAPTIVE CRUISE SYSTEM

[75] Inventors: William J. Chundrlik, Rochester; Pamela I. Labuhn, Utica, both of Mich.

[73] Assignee: General Motors Corporation, Detroit, Mich.

[21] Appl. No.: 481,261

[22] Filed: Feb. 20, 1990

[51] Int. Cl.$^5$ .............................................. G06F 15/50
[52] U.S. Cl. .................. 364/426.04; 340/904; 180/167; 180/170
[58] Field of Search ............... 364/424.01, 426.04; 340/903, 904; 356/5; 180/168, 167, 170

[56] References Cited

U.S. PATENT DOCUMENTS

| 3,152,326 | 10/1964 | Merlo | 343/7 |
| 3,710,383 | 1/1973 | Cherry et al. | 343/7 ED |
| 3,725,921 | 4/1973 | Weidman et al. | 343/7 ED |
| 4,621,705 | 11/1986 | Etoh | 180/169 |
| 4,622,636 | 11/1986 | Tachibana | 364/426.04 |
| 4,628,317 | 12/1986 | Nishikawa et al. | 340/903 |
| 4,703,429 | 10/1987 | Sakata | 364/426.04 |
| 4,706,195 | 11/1987 | Yoshino et al. | 364/426.04 |
| 4,757,450 | 7/1988 | Etoh | 364/426.04 |
| 4,948,246 | 8/1990 | Shigematsu | 356/5 |

OTHER PUBLICATIONS

Takehana, Iwamoto, Sakamoto and Nogami, "Millimeter-Wave Radars for Automotive Use", International Congress on Transportation Electronics Proceedings, 1988.

Primary Examiner—Thomas G. Black
Attorney, Agent, or Firm—Howard N. Conkey

[57] ABSTRACT

An adaptive cruise system for a vehicle maintains a desired selected operator-set speed in the absence of a detected preceding target vehicle and adjusts the vehicle speed when a target vehicle is detected to maintain a following distance that is set by the vehicle operator. An alert distance is computed that is a predetermined function of a distance based on driver reaction time. To provide for the driver selectable trailing distance, the driver reaction term of the alert distance is adjusted by the vehicle operator to achieve a desired distance to the target vehicle.

4 Claims, 2 Drawing Sheets

ADAPTIVE CRUISE SYSTEM

BACKGROUND OF THE INVENTION

This invention relates to an adaptive cruise control system for a vehicle.

It is well known to provide automatic vehicle cruise control systems for maintaining the speed of a vehicle at an operator-set speed. It is further known to provide, in conjunction with these known cruise systems, a system for detecting the presence and the distance to a preceding vehicle and for adjusting the vehicle speed to maintain a trailing distance to the preceding vehicle. In essence, the vehicle speed is controlled to the speed of the preceding vehicle with a predetermined separation from the preceding vehicle with the vehicle speed being limited at the operator-set cruise speed.

Typically, the trailing distance provided by these known systems is a predetermined calibrated value or schedule of values as a function of parameters such as vehicle speed. These calibration values generally do not take into account varying traffic conditions, weather conditions, road surface conditions or personal driving habits of the vehicle operator. The calibrated values are accordingly a compromise that may be optimum for one operator and for a specific set of weather/road/traffic conditions but may not be optimum for different operators and varying conditions.

SUMMARY OF THE INVENTION

It would be desirable to provide for an adaptive cruise control system which maintains a spacing from a preceding vehicle that may be adjusted by the vehicle operator according to his personal driving habits and to the particular weather, road and traffic conditions.

In accord with this invention, an adaptive cruise system is provided that maintains a desired selected operator-set speed in the absence of a detected preceding target vehicle and which adjusts the vehicle speed when a target vehicle is detected to maintain a following distance that is set by the vehicle operator.

In a specific form of this invention, the adaptive cruise system determines the spacing to a target vehicle that is based on a driver reaction term and in which the driver reaction term may be modified by the vehicle operator to adjust the trailing distance.

In one form of the invention, an alert distance is computed that is the sum of a distance based on driver reaction time and the difference between the distance computed for a target vehicle to stop and the distance computed for the controlled vehicle to stop. To provide for a driver selectable trailing distance, the driver reaction term of the alert distance is adjusted by the vehicle operator to achieve a desired distance to the target vehicle.

SUMMARY OF THE DRAWINGS

The invention may be best understood by reference to the following description of a preferred embodiment and the drawings in which.

DESCRIPTION OF A PREFERRED EMBODIMENT

Figure 1:
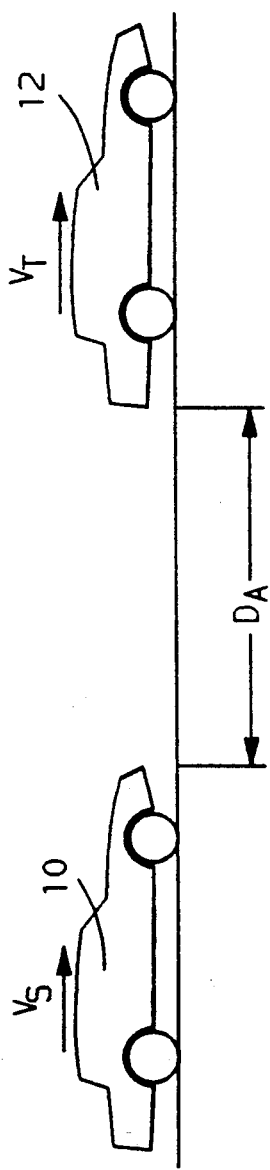
FIG. 1 is a diagram illustrating the relationship between a pair of vehicles including a vehicle incorporating the adaptive cruise system of this invention.

Referring to FIG. 1, there is illustrated a general diagram depicting the relationship between a source vehicle 10, having the adaptive cruise system of this invention, trailing a target vehicle 12 on a roadway surface. The source vehicle 10 has a speed $V_S$, the target vehicle 12 has a speed $V_T$ and the vehicles 10 and 12 are separated by a distance $D_A$.

Figure 2:
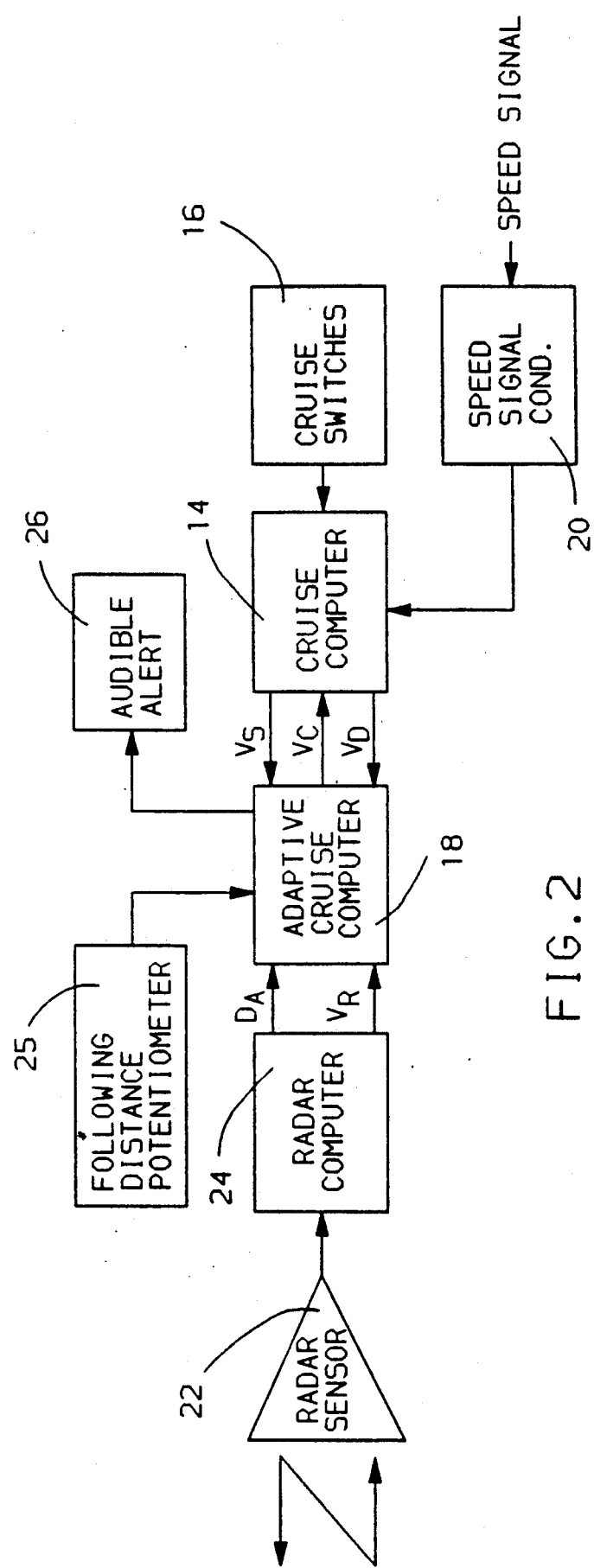
FIG. 2 is a diagram of the adaptive cruise system incorporating the principals of this invention.

The source vehicle 10 includes an adaptive cruise system generally depicted in FIG. 2. The adaptive cruise system includes a conventional cruise computer 14 that is enabled by manual operation of conventional cruise switches 16 (including an on/off switch and a set switch) for maintaining the speed of the source vehicle 10 at a command speed $V_C$ provided by an adaptive cruise computer 18. To enable close-loop control of the speed of the source vehicle 10 to the commanded speed $V_C$, the cruise computer 14 receives a vehicle speed signal that is a measure of the speed $V_S$ of the source vehicle 10 from a speed signal conditioner 20 that in turn receives a speed signal from a transducer monitoring the speed of the source vehicle 10. This speed transducer may be any conventional speed transducer including a speed sensor monitoring the output rotational speed of the transmission. The cruise computer 14 provides to the adaptive cruise computer 18 a vehicle operator set speed $V_D$ and the speed $V_S$ of the source vehicle 10.

The adaptive cruise computer 18 receives information relative to the target vehicle 12 via a conventional radar sensor 22 which provides range and relative velocity information relative to the target vehicle 12. The radar sensor 22 may take the form of a conventional radar system that provides a measure of the distance to a target and the relative velocity between the radar sensor 22 and the target. The output signal of the radar sensor 22 is provided to a radar computer 24 which extracts the distance $D_A$ between the source and target vehicles 10 and 12 along with the relative velocity $V_R$ between the source and target vehicles 10 and 12. The values of $D_A$ and $V_R$ are provided to the adaptive cruise computer 18.

While distance and relative velocity measurements are illustrated as being provided by a radar sensor, other forms of sensors, such as infrared and ultrasound sensors, that provides range and range rate may also be used.

In accord with this invention, the adaptive cruise computer 18 controls via the cruise computer 14 the speed of the source vehicle 10 so as to maintain a desired distance $D_D$ to the target vehicle 12 that is adjustable by the vehicle operator via a following distance potentiometer 25. This potentiometer may be mounted at the instrument panel and may be comprised of a selector having a number of detent positions with a given desired distance value associated with each respective detent position. In another embodiment, the potentiometer 25 may be an infinitely variable potentiometer.

In accord with this invention, the adaptive cruise computer 18 computes an alert distance $D_{alert}$ that is a function of a term based on driver reaction time. This term is adjusted in accord with this invention by control of the following distance potentiometer 25 to provide for a driver-controlled adjustment of the desired distance $D_D$ to be maintained by the source vehicle 10 behind the target vehicle 12. By adjustment of the driver reaction term of $D_{alert}$, the operator of the source vehicle 10 may adjust the desired distance $D_D$ to accommodate various road surface conditions, the set cruise speed $V_D$, traffic conditions and driver preferences. The computed value of $D_{alert}$ is also used to provide an indication to the operator of the source vehicle 10 that the distance $D_A$ to the target vehicle 12 is less than the computed value. This is accomplished by energizing an audible alert 26 positioned in the passenger compartment of the vehicle.

In one embodiment utilizing only the distance $D_A$ to the target, $D_{alert}$ is based solely on the driver reaction term. In another embodiment utilizing both the distance $D_A$ to the target and the relative velocity $V_R$, $D_{alert}$ is based upon (A) a computed distance to bring the source vehicle 10 to a stop, (B) the computed distance required for the target vehicle 12 to come to a full stop and (C) a term based on driver reaction time. In general, however, $D_{alert}$ in each embodiment is a function of the driver reaction term that is adjusted by control of the following distance potentiometer 25 to provide for driver-controlled adjustment of the desired distance $D_D$.

From the computed value of $D_{alert}$, the adaptive cruise computer 18 then computes the desired trailing distance $D_D$. In this embodiment, the value of $D_D$ is established at the sum of $D_{alert}$ plus a constant value X which, in one embodiment, is 13 meters. In other embodiments, X may be a variable such as a function of the speed $V_S$ of the source vehicle. The adaptive cruise computer 18 then provides to the cruise computer 14 a command speed $V_C$ based upon the sensed distance $D_A$ between the source and target vehicles 10 and 12 so as to maintain the desired distance $D_D$. The computed command speed value $V_C$ is limited to the operator set cruise speed $V_S$ established by the vehicle operator by operation of the set cruise switch. The effect of this is that in the absence of a target vehicle 12, the adaptive cruise computer 18 in conjunction with the cruise computer 14 provides for standard conventional cruise control of the source vehicle 10 at the speed $V_D$ set by the vehicle operator upon actuation of the set switch of the cruise switches 16.

Figure 3:
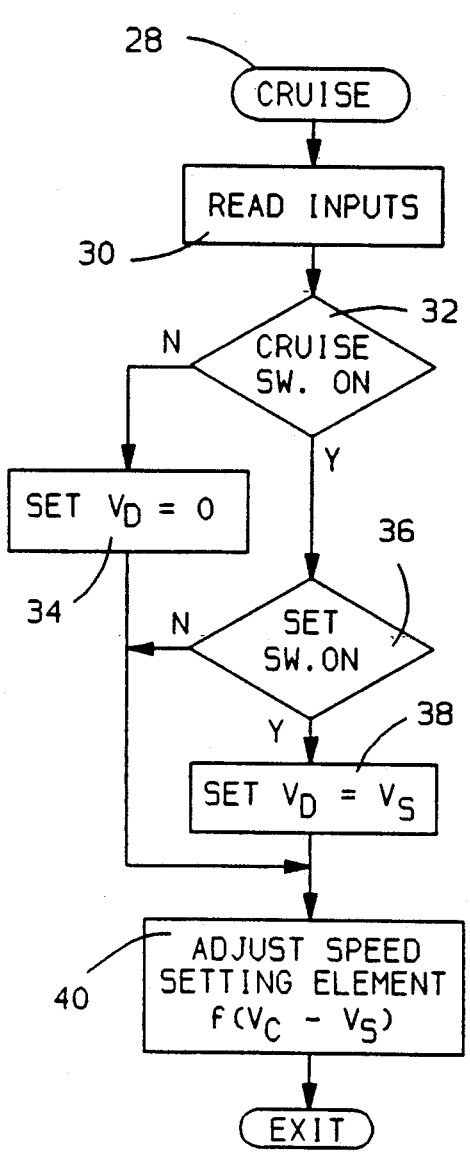
FIGS. 3 and 4 are flow charts illustrating the operation of the adaptive cruise system of FIG. 2 in carrying out the principals of this invention.
Figure 4:
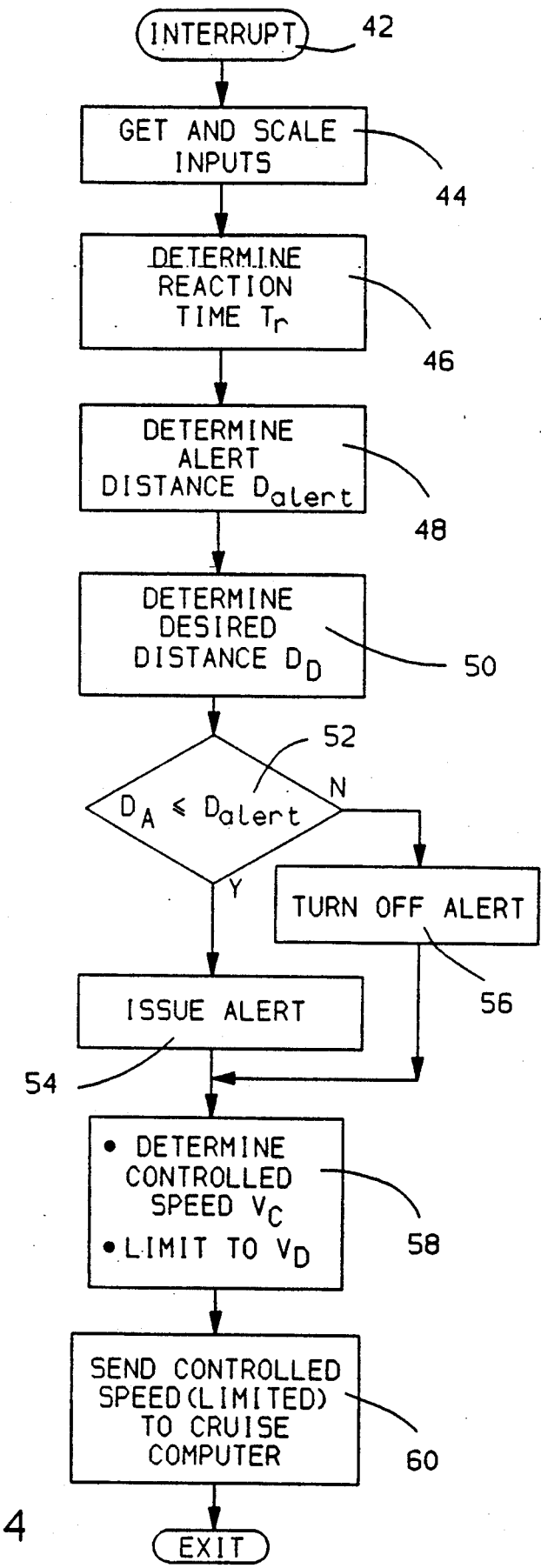

The cruise computer 14, the adaptive cruise computer 18 and the radar computer 24 take the form of conventional general purpose digital computers programmed to control the source vehicle 10 in accord with this invention. These computers generally are comprised of a read-only memory, a random access memory, an analog to digital converter, a central processing unit and an input-output section for interfacing with the external computers and/or devices. The read-only memories of the computers 14 and 18 contain the instructions necessary to implement their respective control algorithms in addition to calibration constants utilized in controlling the source vehicle 10. The flow diagrams of FIGS. 3 and 4 illustrate the control algorithms of the cruise and adaptive cruise computers 14 and 18 and describe the general task or process being executed by the respective computer at that point. The specific programming of the read-only memories for carrying out the functions depicted in the flow diagrams of FIG. 3 and 4 may be accomplished by standard skill in the art using conventional information processing languages.

While the digital computers employed in the cruise computer 14, the adaptive cruise computer 18 and the radar computer 24 may take any conventional form, one such form may be the single chip Motorola microcomputer MC-68HC11. Alternatively, multiple processors or other circuit forms may be employed.

While FIG. 2 illustrates information transfer between computers via individual multiple data lines, the information is typically transferred between the computers via serial communications links generally under the control of one of the processors acting as the master processor.

Referring to FIG. 3, the operation of the cruise computer 14 for controlling the speed of the source vehicle 10 is illustrated. This routine is executed at repeated interrupt intervals established by an internal timer. Upon the occurrence of the time interrupt, the cruise control routine is initiated at step 28 and proceeds to a step 30 where the values of its various inputs are read and stored. These inputs include the state of the cruise switches 16 and the speed of the vehicle represented by the speed signal output of the speed signal conditioner 20.

The next step 32 determines whether the vehicle operator has operated the cruise on/off switch to an on position. If not, the program proceeds to a step 34 where the operator set speed $V_D$ is set equal to 0. Conversely, if the cruise on/off switch has been operated to its on position, the program determines the state of the cruise set switch at step 36. If the set switch is actuated, the program proceeds to a step 38 at which the operator set speed $V_D$ is set equal to the actual vehicle speed $V_S$ read at step 30. As will be described, $V_D$ will be utilized by the adaptive cruise control computer 18 in establishing the commanded speed $V_C$. If step 36 determines that the set switch is not being actuated, the step 38 is bypassed so that the value of $V_D$ previously established at either step 34 or at step 38 remains unchanged.

The cruise routine then provides for control of the source vehicle speed $V_S$ via step 40 by adjusting a speed-setting element on the source vehicle 10 in accord with the error in the source vehicle speed $V_S$ relative to the commanded vehicle speed $V_C$ provided by the adaptive cruise computer 18. For example, the speed setting element may comprise a stepper motor controlled throttle that regulates the air intake of the engine of the source vehicle 10 as described in the U.S. Pat. No. 4,684,866 Neemer et al. which issued Aug. 4, 1987 and which is assigned to the assignee of this invention. In this case, step 38 may further provide for coupling the stepper motor to the throttle shaft, step 34 may further provide for decoupling the stepper motor from the throttle shaft and the step 40 provides for establishing a motor position command that is a function of the speed error and for controlling the stepper motor to achieve the commanded position. In summary, step 40 adjusts the source vehicle speed setting element in direction to restore the actual vehicle speed $V_S$ to the command speed $V_C$. From step 40, the program exits the cruise control routine of FIG. 3.

While not illustrated, it is understood that the cruise routine may also include other conventional cruise functions such as tap up/tap down for incrementally adjusting the operator set speed $V_D$ and the disabling of the cruise in response to the operation of the vehicle brakes.

Referring next to FIG. 4, the interrupt routine executed by the adaptive cruise computer 18 at repeated interrupt intervals established by an internal timer is illustrated. This routine is entered at step 42 and proceeds to a step 44 where the various inputs are obtained and scaled. These inputs include the actual range $D_A$ to the target vehicle 12 and the relative speed $V_R$ between the source and target vehicles 10 and 12 provided by the radar computer 24 (including the sign where the sign is negative when the speed of the target vehicle 10 is greater than the speed of the source vehicle 12), the speed $V_S$ of the source vehicle 10 and the operator-set speed $V_D$ provided by the cruise computer 14 and the operator controlled output of the following distance potentiometer 25. While the various signals between computers are depicted in FIG. 2 as being provided over individual communication lines, it is understood that those signals may be provided by means of a serial data link under control of the adaptive cruise computer 18 such that at step 44, the adaptive cruise computer provides the data exchange via the serial data link.

At step 46, the routine determines a value of a reaction time factor $T_r$ established by the vehicle operator by operation of the following distance potentiometer 25. This value is utilized to establish an operator-controlled distance to be maintained between the source and target vehicles 10 and 12. This time may be variable and represent a driver reaction time varying in one embodiment from 0.3 to 1.75 seconds.

At step 48, the alert distance $D_{alert}$ previously referred to is computed in accord with the expression $$D_{alert} = (V_S^2/K_1) - \{(V_S - V_R)^2/K_2\} + T_r V_S$$

where $K_1$ and $K_2$ are vehicle deceleration rate constants. In one embodiment, $K_1$ and $K_2$ are equal and represent respective deceleration rates of 5 m/s². The first term of the expression represents the distance required to bring the source vehicle 10 to a stop, the second term represents the distance required to bring the target vehicle to a stop and the last expression represents a driver reaction distance based on the driver reaction time set by the vehicle operator via operation of the following distance potentiometer 25 and as computed at step 46. As can be seen, by varying the value of the driver reaction time $T_r$, the value of $D_{alert}$ may be be adjusted by the vehicle operator to accommodate varying driving conditions and driver preference. In another embodiment where only the range $D_A$ to the target vehicle 12 is measured, $D_{alert}$ may be equal to the driver reaction term $T_r V_S$. Other expressions may be utilized for determining $D_{alert}$. However, each includes the driver reaction term and may be generally expressed as $$D_{alert} = f(T_r, V_S).$$

At the next step 50, the desired distance $D_D$ to be maintained between the source and target vehicles 10 and 12 is computed in accord with the expression $$D_D = D_{alert} + X$$

where X is a constant such as 13 meters. The distance $D_D$ represents the distance to be maintained between the source and target vehicles 10 and 12 via control of the speed of the source vehicle 10 limited by the set speed $V_D$ established via the steps 32 through 38 of FIG. 3.

The audible alert 26 is energized when the distance $D_A$ between the source and target vehicles 10 and 12 is less than or equal to the computed alert distance at step 48. When this condition is sensed at step 52, an alert is issued at step 54. However, when the distance $D_A$ is greater than $D_{alert}$, the audible alert 26 is de-energized at step 56.

The routine next determines at step 58 the required command speed $V_C$ to maintain the desired distance $D_D$. This speed is determined in accord with the expression $$V_C = K_p(D_D - D_A) + (V_S - V_R).$$

The term $D_D - D_A$ is the range error between the vehicles 10 and 12, the term $V_S - V_R$ is a measure of the target vehicle speed $V_T$ and $K_p$ is a gain factor that in one embodiment is a constant and in another embodiment is a variable that is a function of the deviation of the distance $D_A$ from the desired distance $D_D$. The effect of the foregoing expression is to provide a proportional control of the speed of the source vehicle 10 to slow down or speed up the source vehicle 10 to attain the desired following distance $D_D$ and then maintain the source vehicle 10 at the speed of the target vehicle 12.

It can be seen from the foregoing expression, that the command speed $V_C$ is equal to the target vehicle speed $V_T$ when the distance $D_A$ between the two vehicles is equal to the desired distance $D_D$.

In the embodiment where only range to the target is measured and where relative velocity is unknown, the expression for $V_C$ is preferably of the form that provides proportional-integral control of the source vehicle 10.

The computed value of $V_C$ is limited at step 58 to a maximum value equal to the set value $V_D$ established by the cruise routine of FIG. 3. The effect of this limit is to establish a cruise speed equal to the operator set speed $V_D$, established when the cruise set switch is actuated, in the absence of a target vehicle 12 or when the target vehicle 12 is at a speed and/or distance to enable the source vehicle 10 to cruise at the operator set speed $V_D$.

Step 60 of the routine then sends the computed speed $V_C$ to the cruise computer 14 via the serial data link which, as previously described, provides via the cruise routine of FIG. 3 for control of the speed of the source vehicle 10 to the commanded speed $V_C$. From step 60, the program exits the interrupt routine of FIG. 4.

The foregoing description of a preferred embodiment of the invention for the purpose of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. An adaptive cruise control system for controlling the distance from a source vehicle to a target vehicle, the system comprising in combination:
   a speed sensor for sensing the speed $V_S$ of the source vehicle;
   means for sensing the distance $D_A$ from the source vehicle to the target vehicle;
   means adjustable by the source vehicle operator for providing a variable signal representing an operator reaction time $T_r$;
   means for determining an alert distance $D_{alert}$ in accord with the expression $$D_{alert} = f(T_r, V_S),$$

where $f(T_r V_S)$ is a predetermined function including the term $T_r V_S$;

means for determining a desired trailing distance $D_D$ from the source vehicle to the target vehicle in accord with the expression $$D_D = D_{alert} + X$$

where X is a constant distance;

means for determining a source vehicle command speed $V_C$ to establish the desired trailing distance $D_D$; and means for controlling the speed of the source vehicle to the source vehicle command speed $V_C$, whereby the speed of the source vehicle is controlled to maintain the distance to the target vehicle at the desired trailing distance $D_D$ that varies in accord with the adjustment of the driver reaction time by the source vehicle operator.

2. The system of claim 1 further including:

manually operable means for establishing an operator desired cruise speed $V_D$; and means for limiting the maximum value of the determined vehicle command speed $V_C$ at the operator desired cruise speed.

3. An adaptive cruise control system for controlling the distance from a source vehicle to a target vehicle, the system comprising in combination:

a speed sensor for sensing the speed $V_S$ of the source vehicle;

means for sensing the distance $D_A$ from the source vehicle to the target vehicle;

means for sensing the relative velocity $V_R$ between the source vehicle and the target vehicle;

means adjustable by the source vehicle operator for providing a variable signal representing an operator reaction time $T_r$;

means for determining an alert distance $D_{alert}$ in accord with the expression $$D_{alert} = (V_S^2/K_1) - \{(V_S - V_R)^2/K_2 56 + T_r V_S,$$

where $K_1$ and $K_2$ are deceleration rate constants;

means for determining a desired trailing distance $D_D$ from the source vehicle to the target vehicle in accord with the expression $$D_D = D_{alert} + X$$

where X is a constant distance;

means for determining a source vehicle command speed $V_C$ in accord with the expression $$V_C = K_p (D_D - D_A) + (V_S - V_R)$$

where $K_p$ is a gain factor; and means for controlling the speed of the source vehicle to the source vehicle command speed $V_C$, whereby the speed of the source vehicle is controlled to maintain the distance to the target vehicle at the desired trailing distance $D_D$ that varies in accord with the adjustment of the driver reaction time by the source vehicle operator.

4. An adaptive cruise control method for controlling the distance from a source vehicle to a target vehicle, the system comprising the steps of:

sensing the speed $V_S$ of the source vehicle;

sensing the distance $D_A$ from the source vehicle to the target vehicle;

sensing the relative velocity $V_R$ between the source vehicle and the target vehicle;

providing an operator controlled signal representing an operator controlled reaction time $T_r$;

determining an alert distance $D_{alert}$ in accord with the expression $$D_{alert} = (V_S^2/K_1) - \{(V_S - V_R)^2/K_2\} + T_r V_S,$$

where $K_1$ and $K_2$ are deceleration rate constants;

determining a desired trailing distance $D_D$ from the source vehicle to the target vehicle in accord with the expression $$D_D = D_{alert} + X$$

where X is a constant distance;

determining a source vehicle command speed $V_C$ in accord with the expression $$V_C = K_p (D_D - D_A) + (V_S - V_R)$$

where $K_p$ is a gain factor; and controlling the speed of the source vehicle to the source vehicle command speed $V_C$, whereby the speed of the source vehicle is controlled to maintain the distance to the target vehicle at the desired trailing distance $D_D$ that varies in accord with the operator controlled reaction time.

* * * * *